US012140744B2

(12) United States Patent
Schmidt et al.

(10) Patent No.: US 12,140,744 B2
(45) Date of Patent: Nov. 12, 2024

(54) AUTOFOCUS SYSTEM AND METHOD

(71) Applicant: Nanotronics Imaging, Inc., Cuyahoga Falls, OH (US)

(72) Inventors: Patrick Schmidt, Brooklyn, NY (US); Denis Sharoukhov, Jersey City, NJ (US); Tonislav Ivanov, Brooklyn, NY (US); Jonathan Lee, Brooklyn, NY (US)

(73) Assignee: Nanotronics Imaging, Inc., Cuyahoga Falls, OH (US)

( * ) Notice: Subject to any disclaimer, the term of this patent is extended or adjusted under 35 U.S.C. 154(b) by 0 days.

(21) Appl. No.: 18/045,007

(22) Filed: Oct. 7, 2022

(65) Prior Publication Data

US 2024/0019678 A1  Jan. 18, 2024

Related U.S. Application Data

(60) Provisional application No. 63/368,570, filed on Jul. 15, 2022.

(51) Int. Cl.
*G02B 21/24* (2006.01)
*G02B 21/36* (2006.01)

(52) U.S. Cl.
CPC ......... *G02B 21/244* (2013.01); *G02B 21/245* (2013.01); *G02B 21/365* (2013.01)

(58) Field of Classification Search
CPC ... G02B 21/244; G02B 21/245; G02B 21/365
See application file for complete search history.

(56) References Cited

U.S. PATENT DOCUMENTS

| 5,408,098 A | 4/1995 | Wells | |
|---|---|---|---|
| 6,376,818 B1 * | 4/2002 | Wilson | G06T 7/55 |
| | | | 250/201.3 |

(Continued)

FOREIGN PATENT DOCUMENTS

| CN | 112639582 | 4/2021 |
|---|---|---|
| TW | 202104970 | 2/2021 |

(Continued)

OTHER PUBLICATIONS

International Search Report and Written Opinion for Application No. PCT/US2023/068608, mailed on Nov. 20, 2023, 11 Pages.

(Continued)

*Primary Examiner* — Seung C Sohn
(74) *Attorney, Agent, or Firm* — DLA Piper LLP US

(57) ABSTRACT

A microscopy system and method of focusing the same are disclosed herein. The microscopy system may include an objective, and imaging device, an illumination source, an epi-illumination module, and a controller. The imaging device is configured to capture a single image of a specimen positioned on a stage of the microscopy system. The illumination source is configured to illuminate the specimen positioned on the stage. The epi-illumination module includes a focusing mechanism in a first primary optical path of a light generated by the illumination source. The focusing mechanism is tilted in relation to a plane perpendicular to the first primary optical path. The controller is in communication with the illumination source. The controller is configured to focus the microscopy system based on a pattern produced by the focusing mechanism on the single image captured by the imaging device.

19 Claims, 14 Drawing Sheets

(56) References Cited

U.S. PATENT DOCUMENTS

| | | | |
|---|---|---|---|
| 7,923,672 | B2* | 4/2011 | Wolleschensky .. G01N 21/6458 |
| | | | 356/485 |
| 9,274,402 | B2* | 3/2016 | Okamoto ............. H04N 23/635 |
| 11,356,594 | B1 | 6/2022 | Bruguier et al. |
| 2011/0109960 | A1 | 5/2011 | Shrota |
| 2016/0127702 | A1 | 5/2016 | Tsao et al. |
| 2016/0370264 | A1 | 12/2016 | Campebll |

FOREIGN PATENT DOCUMENTS

| WO | 2010061250 | 6/2010 |
|---|---|---|
| WO | 2021026278 | 2/2021 |

OTHER PUBLICATIONS

Office Action from Taiwan Patent Application No. 112125478, dated May 23, 2024, 11 pages.

* cited by examiner

AUTOFOCUS SYSTEM AND METHOD

CROSS-REFERENCE TO RELATED APPLICATIONS

This application claims priority to U.S. Provisional Application Ser. No. 63/368,570, filed Jul. 15, 2022, which is hereby incorporated by reference in its entirety.

FIELD OF DISCLOSURE

The present disclosure generally relates to systems, apparatuses, and methods for automatically focusing a microscopy system using a single image.

BACKGROUND

Most specimens that are observed with a microscope have small variations in height across their surfaces. While these variations are frequently not visible to the human eye, they can cause images of a portion of a specimen captured by a microscope to be out of focus.

The range in which a microscope can create a usable focused image is known as the depth of field. The microscope must keep a portion of a specimen within its depth of field to generate useful images. However, when transitioning from observing a first portion of a specimen to observing a second portion of the specimen, the small variations in height of the specimen may cause the second portion to be outside the depth of field.

Different sharpness measurements such as image contrast, resolution, entropy and/or spatial frequency content, among others, can be used to measure the quality of focus of images captured by a microscope. Generally, when a specimen is in focus, the captured image will exhibit the best sharpness quality (e.g., large contrast, a high range of intensity values and sharp edges). The different sharpness measurements that can be used to determine when a specimen is in focus usually require capturing a series of images and increasing or decreasing the distance between the microscope objective lens and the specimen until the image appears in focus. This increases the total microscopic scan time of each specimen, making methods using such measurement prohibitively slow for high throughput scanning applications.

Accordingly, a system is needed for performing autofocus in a single image, wherein the system can provide both a direction and distance to achieve focus.

SUMMARY

In some embodiments, an imaging system is disclosed herein. The imaging system includes a lens, an imaging device, an illumination source, an epi-illumination module, and a controller. The imaging device is configured to capture a single image of an object positioned at a focal plane. The illumination source is configured to illuminate the object. The epi-illumination module includes a focusing mechanism in a first primary optical path of a light generated by the illumination source. The focusing mechanism is tilted in relation to a plane perpendicular to the first primary optical path. The controller is in communication with the imaging device. The controller includes one or more programming instructions that, when executed, cause the controller to focus the imaging system based on a pattern produced by the focusing mechanism based on the single image captured by the imaging device.

In some embodiments, a microscopy system is disclosed herein. The microscopy system includes an objective, an imaging device, an illumination source, an epi-illumination module, and a controller. The imaging device is configured to capture a single image of a specimen positioned on a stage of the microscopy system. The illumination source is configured to illuminate the specimen positioned on the stage. The epi-illumination module includes a focusing mechanism in a first primary optical path of a light generated by the illumination source. The focusing mechanism is tilted in relation to a plane perpendicular to the first primary optical path. The controller is in communication with the imaging device. The controller includes one or more programming instructions that, when executed, cause the controller to focus the microscopy system based on a pattern produced by the focusing mechanism based on the single image captured by the imaging device.

In some embodiments, a method for focusing a microscopy system is disclosed herein. A controller causes an illumination source of the microscopy system to illuminate a specimen positioned on a stage of the microscopy system. The controller receives a single image of the specimen. The single image includes a pattern produced by a focusing mechanism positioned in a light path between the illumination source and the stage. The controller determines that the single image is not in focus by analyzing the pattern produced by the focusing mechanism. Based on the determining, the controller focuses the microscopy system.

In some embodiments, a focusing system for automatically focusing a microscopy system is disclosed herein. The focusing system includes an illumination source and a focusing mechanism. The focusing mechanism is configured to be positioned within a light path produced by the illumination source. The focusing mechanism is configured to project a pattern on a specimen to be imaged by the microscopy system.

BRIEF DESCRIPTION OF THE DRAWINGS

Aspects and embodiments of this application are depicted in the figures, wherein.

DETAILED DESCRIPTION OF EMBODIMENTS

Described herein are systems and methods for automatically focusing a microscopy system. An automatic focus system can be implemented as part of any suitable type of microscope. For example, in some embodiments, system can be implemented as part of an optical microscope that uses transmitted light or reflected light. More particularly, a system can be implemented as part of the nSpec® optical microscope available from Nanotronics Imaging, Inc. of Cuyahoga Falls, Ohio. In some embodiments, an automatic focus system may be configured to focus a microscope based on a single image.

In some embodiments, the auto focus system may include an epi-illumination module. An epi-illumination module may enable illumination of a sample on the same side as the microscope objective. Epi-illumination modules may be used in fluorescence, confocal, and reflected light microscopy. Although the examples provided herein refer to reflected light microscopy, one of ordinary skill in the art will recognize that the systems and methods may be used as a reflective focusing module to facilitate focusing in fluorescence and confocal microscopy as well. In some embodiments, an epi-illumination module may be removably interfaced to a microscope. In other embodiments, an epi-illumination module may be integrated to the microscope.

Although the below discussion discusses an autofocus system in the context of a microscopy, those skilled in the art understand that such system can be expanded outside of microscopy to other imaging systems. For example, the autofocus system may be used in digital cameras.

Figure 1:
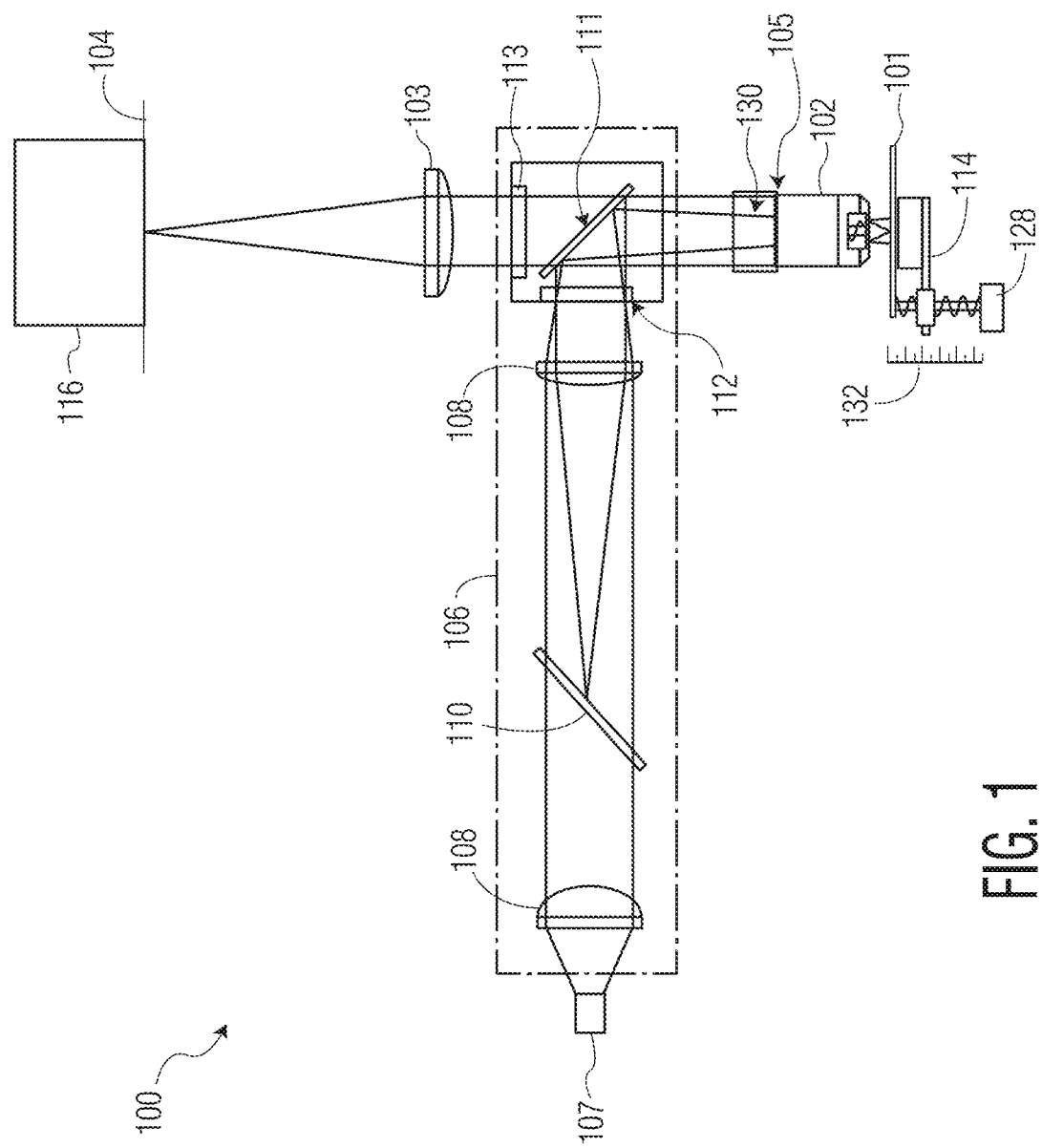
FIG. 1 illustrates a microscopy system that includes a focusing mechanism, according to example embodiments.

FIG. 1 illustrates an automatic focus microscopy system 100 (hereinafter "microscopy system 100"), according to example embodiments. The microscopy system 100 may include one or more objectives 102, an illumination source 107, an epi-illumination module 106, a stage 114, an imaging device 116, and a controller (not shown).

Objectives 102 may have different magnification powers and/or be configured to operate with brightfield/darkfield microscopy, differential interference contrast (DIC) microscopy and/or any other suitable form of microscopy. In some embodiments, the objective 102 and/or microscopy technique used to inspect a specimen in a sample plane 101 on a stage 114 may be controlled by software, hardware, and/or firmware. In some embodiments, the microscopy system 100 may be representative of an infinity-corrected microscope. In such embodiments, the microscopy system 100 may further include a tube lens 103 configured to focus the parallel light from an infinity-corrected objective 102 to the imaging device 116.

In some embodiments, the stage 114 may be used to adjust the sample along an XY plane. In some embodiments, the stage 114 may be driven by a stepper motor, servo motor, linear motor, and/or any other suitable mechanism.

In some embodiments, the imaging device 116 may be used to capture one or more images of a sample to determine whether the microscopy system 100 is in focus. For example, in operation, the imaging device 116 may be configured to capture one or more images of a specimen and may provide those images to controller for further processing. In some embodiments, the same, or a separate imaging device may be used to capture one or more images of a sample once the sample is in focus. In some embodiments, the image sensor may be a CCD, CMOS and/or any other suitable electronic device that allows images of a sample to be captured and stored.

In some embodiments, the microscopy system 100 may further include a first actuator 128. The first actuator 128 may be used to drive the objective 102 in a Z axis towards and away from stage 114. In some embodiments, the first actuator 128 may be configured for high precision and fine focus adjustment of the objective 102. In some embodiments, the first actuator 128 may be representative of a stepper motor, servo motor, linear actuator, piezo motor, and/or any other suitable mechanism. For example, in some embodiments, a piezo motor may be used to drive the objective 102 from 0 to 50 micrometers (µm), 0 to 100 µm, or 0 to 200 µm, and/or any other suitable range(s) of distances.

In some embodiments, the microscopy system 100 may further include a second actuator 130. The second actuator 130 may be configured to adjust the stage 114 in a Z axis towards and away from the objective 102. In some embodiments, the second actuator 130 may be used to make coarse focus adjustments of, for example, 0 to 100 µm, 0 to 5 mm, 0 to 10 mm, 0 to 30 mm, and/or any other suitable range(s) of distances. In some embodiments, the second actuator 130 may be used to adjust the stage 114 up and down to allow specimens of different thicknesses to be viewed via the objective 102. In some embodiments, the second actuator 130 may provide fine focus of, for example, 0 to 100 nm, 0 to 5 µm, 0 to 50 µm, 0 to 100 µm, 0 to 200 µm, and/or any other suitable range(s) of distances.

In some embodiments, the microscopy system 100 may also include a location device 132. In some embodiments, location device 132 may be configured to store an absolute position of stage 114, even upon reset and/or power cycling of microscopy system 100. In some embodiments, location device 132 can be a linear encoder, a rotary encoder or any other suitable mechanism to track the absolute position of stage 114 with respect to objective 102.

The means of adjusting focus are provided as an illustrative example. A person of ordinary skill in the art will note that other means may be used in conjunction with the systems and methods described herein.

Epi-illumination module 106 may be configured to illuminate a sample positioned on stage 114. In some embodiments, the epi-illumination module 106 may be further configured to provide a pattern in an image, collected by the imaging device 116, which may be utilized to automatically focus the microscopy system 100. In some embodiments, the epi-illumination module 106 is a removable module from the microscopy system 100.

In some embodiments, the epi-illumination module 106 may be interfaced to an illumination source 107. The illumination source 107 may be configured to illuminate the stage 114. For example, the illumination source 107 may be configured to illuminate the stage 114 for determining when the microscopy system 100 is in focus. In some embodiments, the epi-illumination module 106 includes one or more optical elements 108 configured to produce homogeneous illumination of the sample plane 101. In some embodiments, the optical elements 108 may include at least one or more collimating and/or focusing lenses. In further embodiments, the optical elements 108 may form an aperture stop conjugated to the objective back focal plane 105.

In some embodiments, the epi-illumination module 106 includes a dichroic mirror 111 configured to reflect the illumination source 107 through the objective 102 onto the sample positioned on stage 114. In some embodiments, the epi-illumination module 106 includes one or more filters (e.g., an excitation filter 112 and/or an emission filter 113). In further embodiments, a portion of the one or more filters may be polarizing.

In some embodiments, the epi-illumination module 106 may include a focusing mechanism 110. The focusing mechanism 110 may be positioned in the optical path of the illumination source 107 within the epi-illumination module 106. In some embodiments, the focusing mechanism 110 may be positioned after a collimating lens such that the light passing through the focusing mechanism is aligned in a primarily parallel fashion. In some embodiments, the focusing mechanism 110 may be configured to provide a pattern in an image, collected by the imaging device 116, which may be utilized to automatically focus the microscopy system 100.

In some embodiments, the focusing mechanism 110 may be representative of a mesh. In some embodiments, the focusing mechanism 110 may be representative of a piece of glass that includes a Ronchi ruling pattern. A person of ordinary skill in the art will recognize that any finely patterned element configured to allow at least partial transmission of light from the illumination source 107 may operate as a focusing mechanism 110.

In some embodiments, focusing mechanism 110 may include a partial pattern. In some embodiments, the projection on the specimen or object and the resulting image would be pattern free on a first portion of the image and patterned on a second portion of the image (corresponding to where the pattern was visible). In some embodiments, the patterned portion of the image may be used for focusing. By using a focusing mechanism 110 with a partial pattern, focusing mechanism 110 can remain in place at all times and a single wavelength can be used.

In operation, for example, the light generated from the illumination source 107 may pass through the focusing mechanism 110 on a path to illuminate the stage 114. In some embodiments, the focusing mechanism 110 may be tilted with respect to a plane perpendicular to the primary path of the light generated from the illumination source 107. In other words, the focusing mechanism 110 may be tilted such that the focusing mechanism 110 is not parallel to the optical elements 108 in the epi-illumination module 106. In some embodiments, the focusing mechanism 110 is configured to intersect a field stop conjugated to the sample plane 101 and a field stop conjugated to the image plane 104. In some embodiments, the focusing mechanism 110 intersects multiple field stops not conjugated to the sample plane 101.

A person of ordinary skill in the art will note that some epi-illumination modules may include a diffuser configured to prevent objects upstream from being imaged. In some embodiments, the systems and methods described herein may require the removal of said diffuser.

Figure 2C:
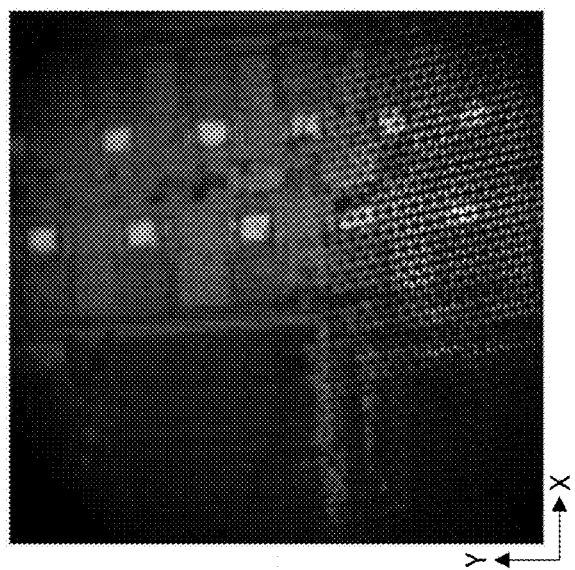
FIGS. 2A-2C depict example captured images from a microscopy system at difference distances from focus, according to example embodiments.
Figure 2B:
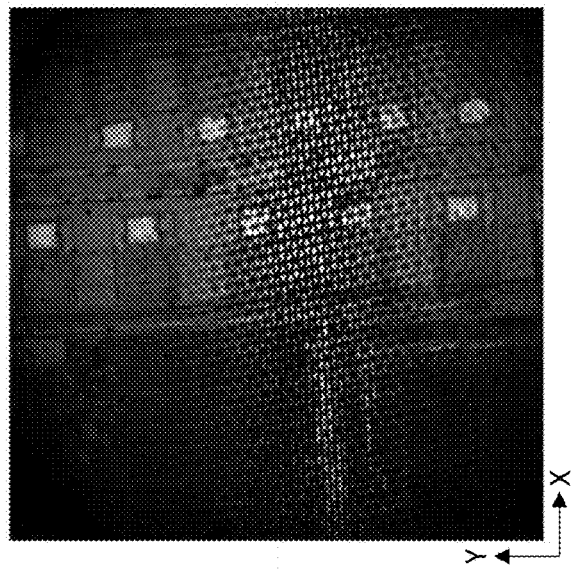
Figure 2A:
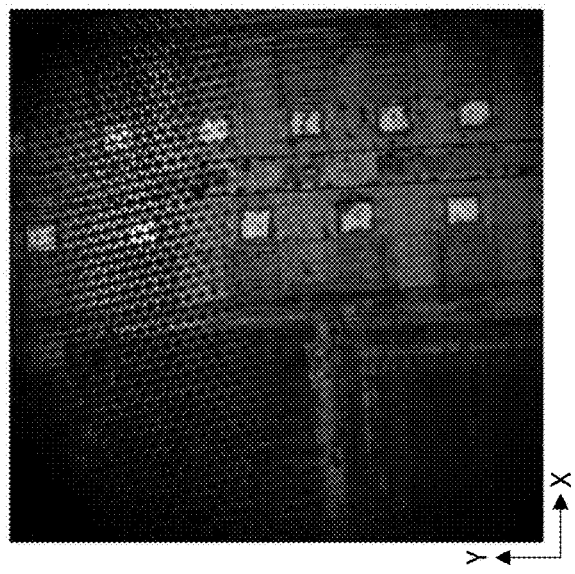

In some embodiments, the tilt of the focusing mechanism will produce a variation in focus across a captured image. Referring to FIGS. 2A-2C, example captured images from a microscopy system comprising a focusing mechanism are depicted in accordance with an embodiment. As a result of the tilt in the focusing mechanism, only a portion of the focusing mechanism is focused at any given depth of focus configured within the microscope. FIG. 2A depicts a captured image in which an upper portion of the focusing mechanism is in focus. FIG. 2B depicts a captured image in which the middle portion of the focusing mechanism is in focus. FIG. 2C depicts a captured image in which a lower portion of the focusing mechanism is in focus. In these examples, an adjustment in focus within the microscopy system correlates to a change in the focused portion of the image along the Y axis.

Adjusting the axis of tilt of the focusing mechanism may create a different correlation in focus (e.g., along the X axis, or a diagonal). In some embodiments, the tilt is configured such that a portion of the focusing mechanism is focused at the entire range of depth of focus for the microscope. In some embodiments, the focusing mechanism is tilted between 0° and ±90° from a perpendicular to the primary optical path of the epi-illumination system. In further embodiments, the range may be between ±10° and ±80°. In other embodiments, the range may be between ±45° and ±60°. In some embodiments, the tilt angle may be adjustable. It should be noted that a shaper angle may equal a narrower focused area. In some embodiments, a narrowed focused area may produce a more accurate focus adjustment, based on the methods described herein. In some embodiments, a sharper angle of the focusing mechanism may occlude a substantial amount the illumination source. In some embodiments, focusing mechanism 110 may be non-planar. In further embodiments, focusing mechanism 110 may be curved. A non-planar focusing mechanism may provide an optical response wherein a portion of the focal range produces a narrower focus area and another portion produces less illumination occlusion. One of ordinary skill in the art will recognize that various other configurations of epi-illumination modules may be modified with a focusing mechanism to produce similar optical responses.

The controller may be configured to determine a direction and distance to focus the microscope. In some embodiments, the controller may receive an image, via the imaging device 116, of the sample featuring the pattern projected by the focusing mechanism 110. In further embodiments, the controller may receive one or more additional similar images. In some embodiments, the controller may receive the location of the stage 114 from the location device 132.

In some embodiments, the controller may process the image, through methods described herein, to determine the direction and distance to focus the microscope. In some embodiments, the controller may interface directly to a means for focusing the microscope (e.g., one or more actuators). In further embodiments, the controller may automatically focus the microscope using said means, based on the determined direction and distance. In some embodiments, the controller may interface to a display device for displaying an indication of the direction and distance to focus to a user.

Figure 3:
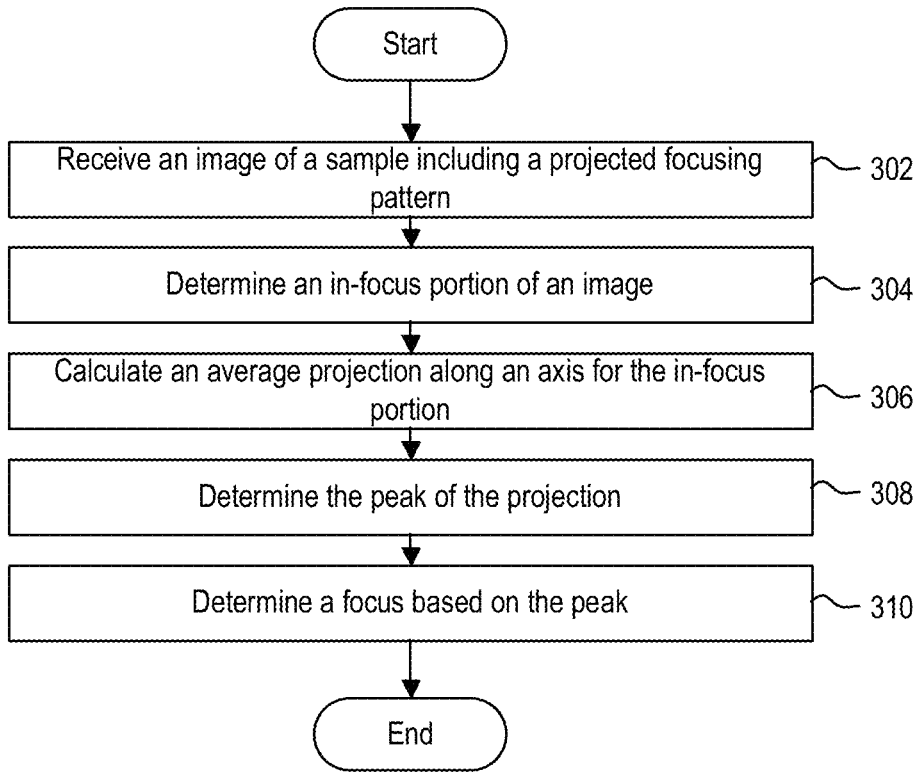
FIG. 3 is a flow diagram illustrating a method of determining a focus adjustment for a microscopy system, according to example embodiments.

FIG. 3 is a flow diagram illustrating a method 300 for focusing the microscopy system 100, according to example embodiments.

At step 302, the controller may receive an image of a sample positioned on the stage 114. The controller may receive the image of the sample from the imaging device 116 via one or more wired or wireless connections. For example, in operation, the focusing mechanism 110 may be placed within the illumination path of the microscopy system 100. In some embodiments, the light may be collimated. In some embodiments, the light may be partially occluded by the focusing mechanism 110 resulting in an illumination pattern appearing on the sample, as imaged by the imaging device 116. In some embodiments, a tilt in the focusing mechanism 110 may result in a varying focus in the illumination pattern applied to the sample.

Figure 4:
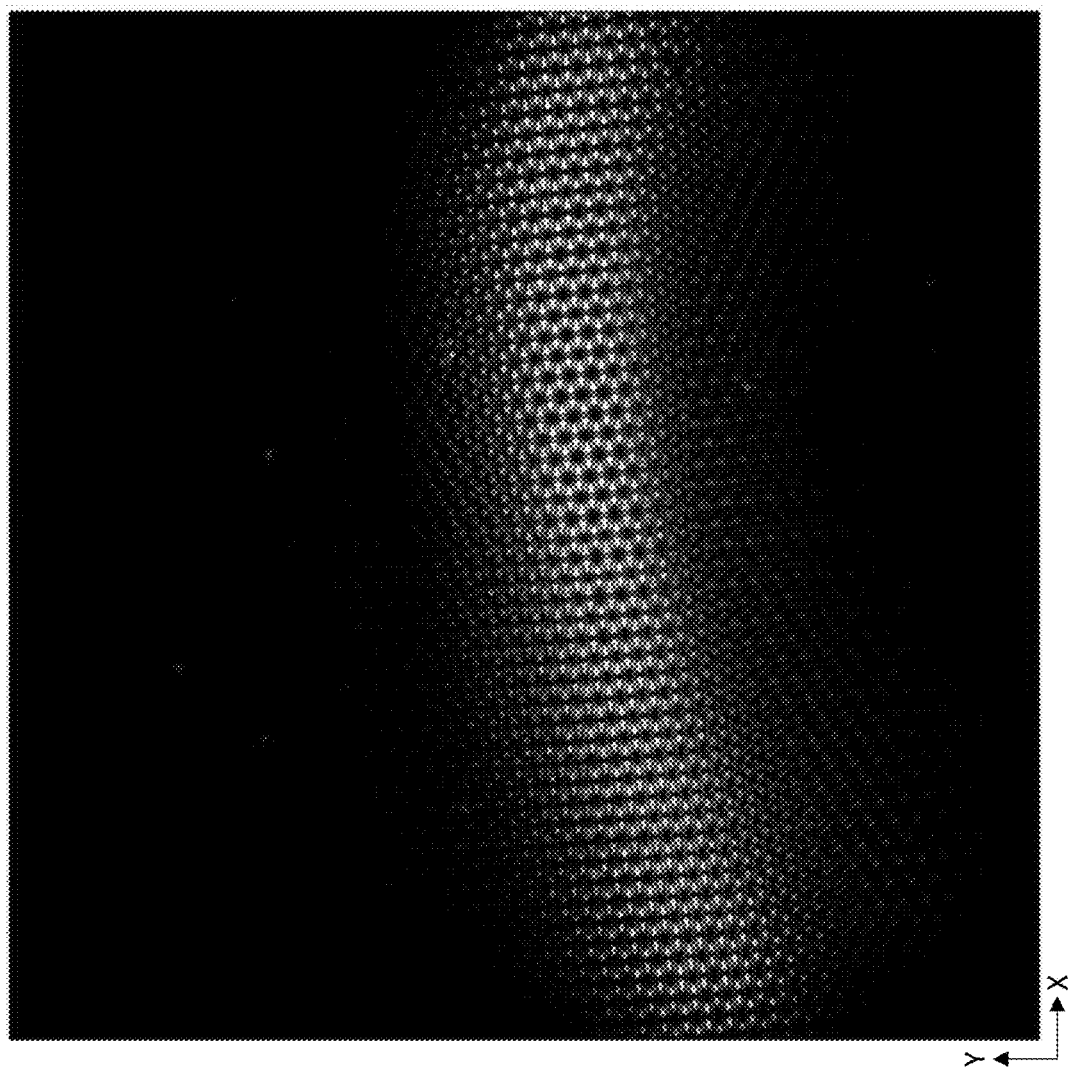
FIG. 4 is an example image illustrating a detected sharp region, according to example embodiments.

At step 304, controller may determine an in-focus, or sharpest, region of the image. Referring briefly to FIG. 4, a detected sharpest region in an example captured image is depicted in accordance with an embodiment. In some embodiments, detecting a sharpest region may include applying a feature enhancement algorithm. In further embodiments, the feature enhancement algorithm may be an edge detection algorithm. In some embodiments, the feature enchantment algorithm may include a difference of Gaussians (DoG).

Figure 5A:
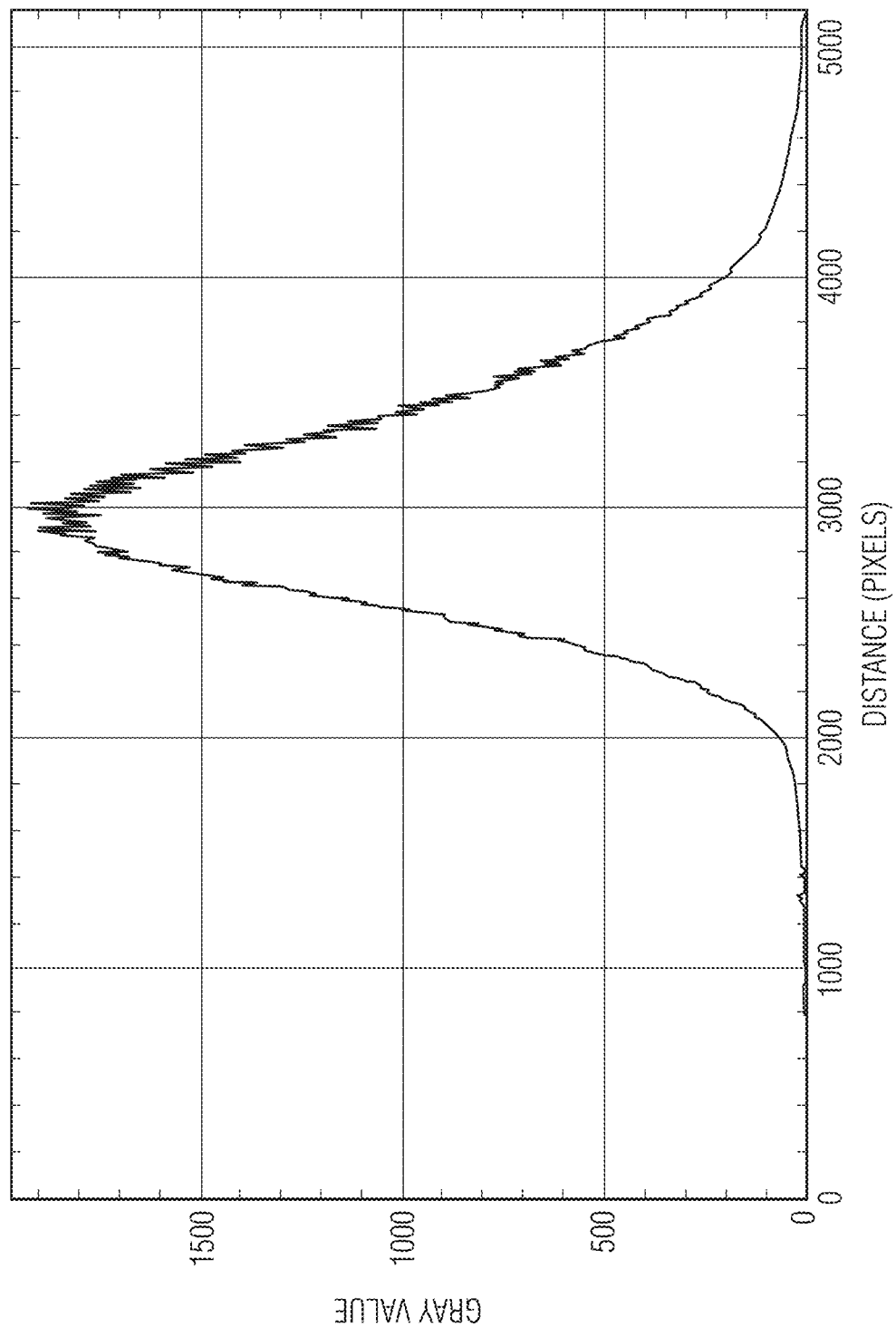
FIG. 5A is an image depicting an average projection along the X-axis of the gray value of the detected in-focus region of FIG. 4, according to example embodiments.

At step 306, the controller may generate an average projection along an axis for the in-focus portion of the image. In some embodiments, the axis of projection correlates to the axis of tilt for the mesh. Referring briefly to FIG. 5A, an average projection of the gray value of the detected in-focus region from FIG. 4 is depicted, in accordance with an embodiment. In this example, the projection is performed along the X-axis of the image.

Figure 5B:
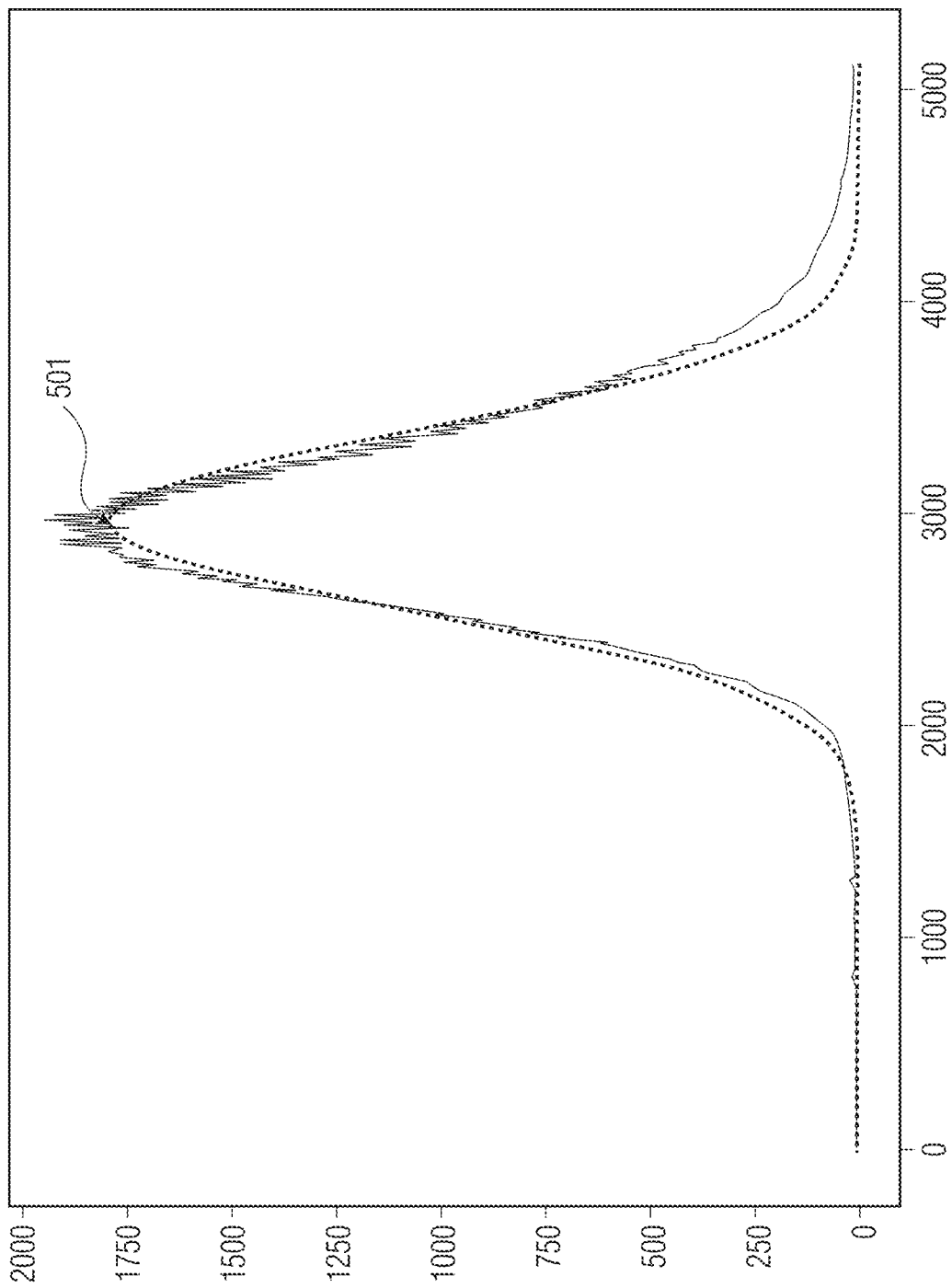
FIG. 5B is an image depicting a best fit Gaussian to the projection of FIG. 4, according to example embodiments.

At step 308, the controller may determine a peak value of the projection (i.e., the most in focus pixel along the axis). In some embodiments, the method of determining a peak value includes determining a best fit Gaussian to the projection. In some embodiments, the controller may determine a peak value of the best fit Gaussian distribution. Referring briefly to FIG. 5B, a best fit Gaussian distribution to the projection illustrated in FIG. 5A is depicted in accordance with embodiment. The peak value in gray scale intensity 501 may then be correlated to a pixel distance along the axis.

Figure 6:
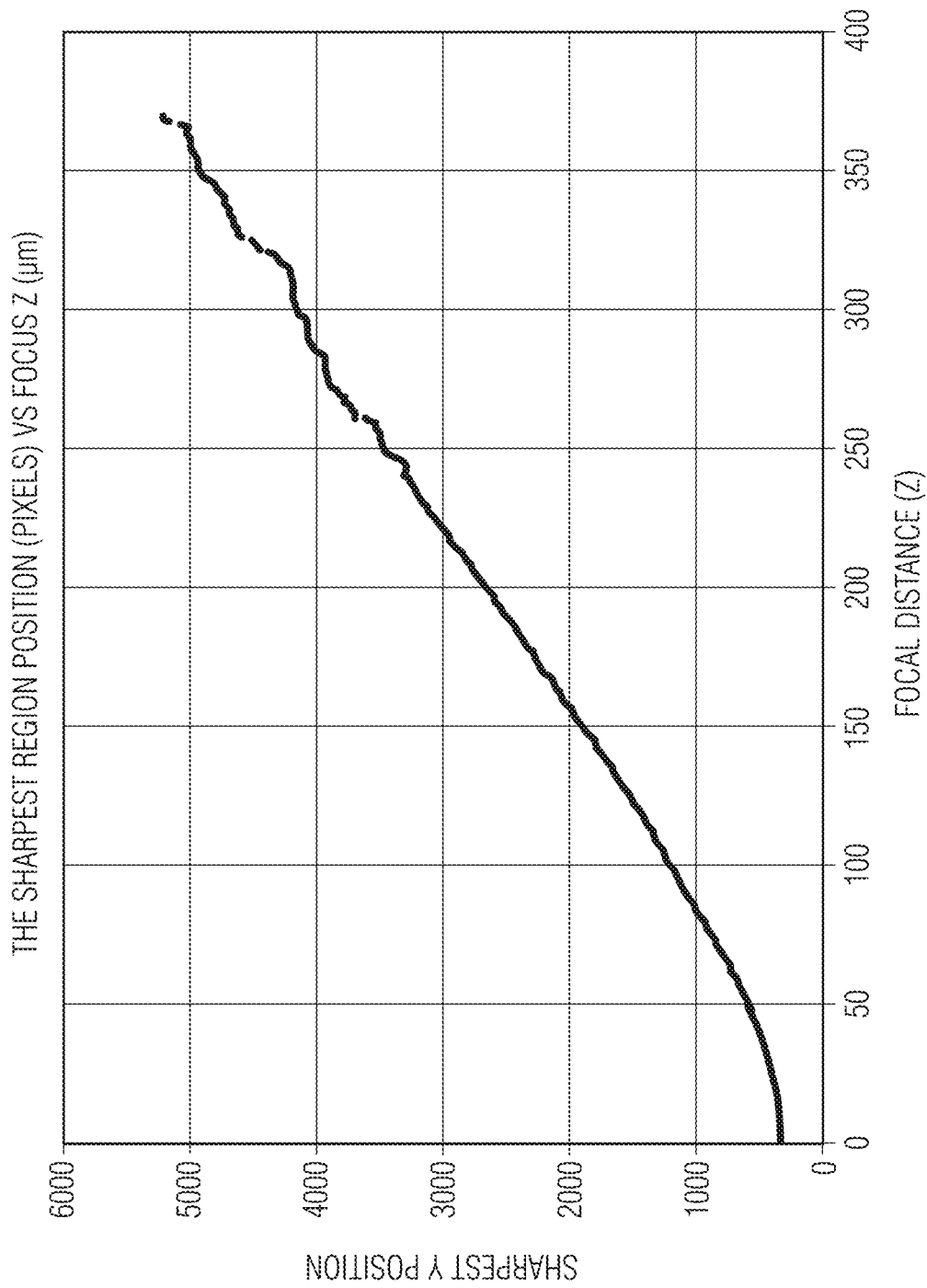
FIG. 6 depicts an illustrative plot of the sharpest region position in an image versus the focus, according to example embodiments.

At step 310, controller may determine a focus direction and distance based on the peak value. In some embodiments, determining a focus direction and distance may be performed using a machine learning algorithm. In some embodiments, the machine learning algorithm may be trained on a dataset comprising the peak pixel value for sharpness over a series of focal distances with signed distances to focus. Referring to FIG. 6, an illustrative plot of the sharpest region in an image versus the focal distance is depicted in accordance with an embodiment. In some embodiments, the machine learning algorithm may be provided a sharpest position along an axis and a current focal distance, based on a single image, and determine a focus direction and distance.

In some embodiments, the machine learning algorithm training may be instrument specific. In some embodiments, the relationship between the sharpest region and the focal distance may be linear. In some embodiments, the focal distance and direction may be calculated using the equation for said line. A person of ordinary skill in the art will recognize that other mathematical relationships between the sharpest region and the focal distance may be established through modifications to the focusing mechanism 110. Example modifications may include varying distances between the pattern generating elements in the focusing mechanism 110 or introducing bends or curves to the focusing mechanism 110.

In some embodiments, similar instruments may be calibrated via a known instrument's algorithm and an offset between the known instrument and the similar instrument.

In some embodiments, the system may automatically focus the microscope based on the determined focus direction and distance.

In some embodiments, the system may provide output to a user based on the determined focus direction and distance. In further embodiments, output may include at least one of a visual indicator (e.g., on a monitor, or through indicator lights), an audio indicator, or a haptic indicator.

In some embodiments, the system may auto focus based on reflected illumination, and then produce a focused image based transmitted illumination. In further embodiments, by changing the illumination source, the focusing mechanism 110 may no longer be in the illumination optical path and thus not appear in the resulting image.

In some embodiments, the system may be configured to allow for the removal of the focusing mechanism 110 from the optical path of illumination source. In some embodiments, it may be desirable to capture an image of the sample without the illumination interference provided by the focusing mechanism 110 after an optimal focus is achieved. In some embodiments, removal of the focusing mechanism 110 may include a physical removal of the focusing mechanism 110 from the optical path. In some embodiments, the physical removal of the focusing mechanism 110 may be manual. In other embodiments, the physical removal of the focusing mechanism 110 may be automated. In some embodiments, the automated movement of the focusing mechanism 110 may include the use of a motor and/or electromagnet. In some embodiments, the focusing mechanism 110 may include a framework for aligning the focusing mechanism 110 in the optical path. In some embodiments, the focusing mechanism 110 may include at least one of a rail, magnet, or hinge for facilitating mechanical movement and/or alignment.

Figure 7:
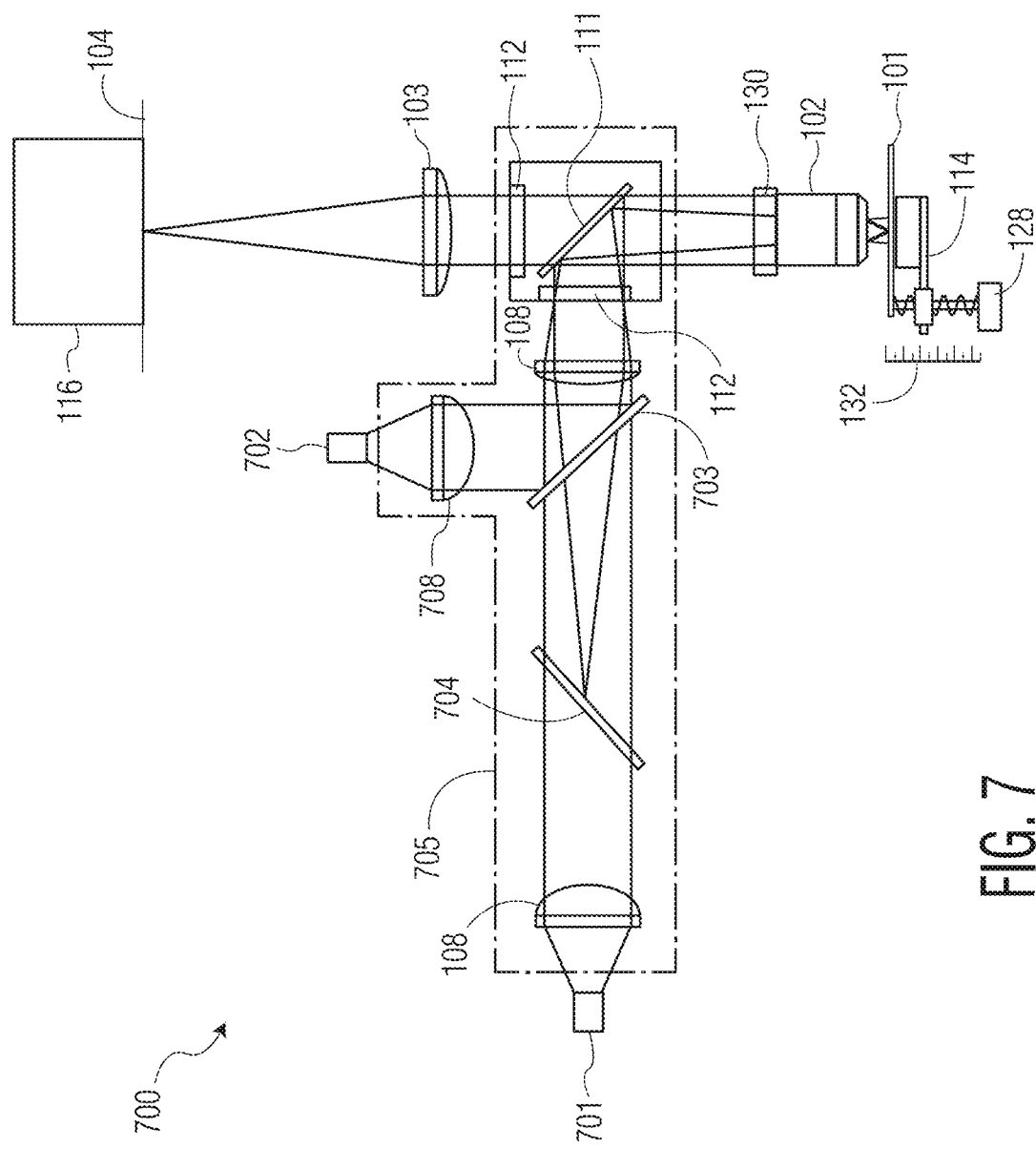
FIG. 7 illustrates a microscopy system that includes two illumination paths, according to example embodiments.

FIG. 7 illustrates a microscopy system 700 that includes an epi-illumination system with two illumination paths, according to example embodiments. In some embodiments, the microscopy system 700 may include similar elements to those described in reference to FIG. 1. The microscopy system 700 may include one or more objectives 102, an illumination source 701, an epi-illumination module 705, a stage 114, an imaging device 116, and a controller (not shown).

Objectives 102 may have different magnification powers and/or be configured to operate with brightfield/darkfield microscopy, differential interference contrast (DIC) microscopy and/or any other suitable form of microscopy. In some embodiments, the objective 102 and/or microscopy technique used to inspect a specimen in a sample plane 101 on a stage 114 may be controlled by software, hardware, and/or firmware. In some embodiments, the microscopy system 700 may be representative of an infinity-corrected microscope. In such embodiments, the microscopy system 700 may further include a tube lens 103 configured to focus the parallel light from an infinity-corrected objective 102 to the imaging device 116.

In some embodiments, the stage 114 may be used to adjust the sample along an XY plane. In some embodiments, the stage 114 may be driven by a stepper motor, servo motor, linear motor, and/or any other suitable mechanism.

In some embodiments, the imaging device 116 may be used to capture one or more images of a sample to determine whether the microscopy system 700 is in focus. For example, in operation, the imaging device 116 may be configured to capture one or more images of a specimen and may provide those images to controller for further processing. In some embodiments, the same, or a separate imaging device may be used to capture one or more images of a sample once the sample is in focus. In some embodiments, the image sensor may be a CCD, CMOS and/or any other suitable electronic device that allows images of a sample to be captured and stored.

In some embodiments, the microscopy system 700 may further include a first actuator 128. The first actuator 128 may be used to drive the objective 102 in a Z axis towards and away from stage 114. In some embodiments, the first actuator 128 may be configured for high precision and fine focus adjustment of the objective 102. In some embodiments, the first actuator 128 may be representative of a stepper motor, servo motor, linear actuator, piezo motor, and/or any other suitable mechanism. For example, in some embodiments, a piezo motor may be used to drive the objective 102 from 0 to 50 micrometers (µm), 0 to 100 or 0 to 200 µm, and/or any other suitable range(s) of distances.

In some embodiments, the microscopy system 700 may further include a second actuator 130. The second actuator 130 may be configured to adjust the stage 114 in a Z axis towards and away from the objective 102. In some embodiments, the second actuator 130 may be used to make coarse focus adjustments of, for example, 0 to 100 µm, to 5 mm, 0 to 10 mm, 0 to 30 mm, and/or any other suitable range(s) of distances. In some embodiments, the second actuator 130 may be used to adjust the stage 114 up and down to allow specimens of different thicknesses to be viewed via the objective 102. In some embodiments, the second actuator 130 may provide fine focus of, for example, 0 to 100 nm, 0 to 5 µm, 0 to 50 µm, 0 to 100 µm, 0 to 200 µm, and/or any other suitable range(s) of distances.

In some embodiments, the microscopy system 700 may also include a location device 132. In some embodiments, location device 132 may be configured to store an absolute position of stage 114, even upon reset and/or power cycling of microscopy system 700. In some embodiments, location device 132 can be a linear encoder, a rotary encoder or any other suitable mechanism to track the absolute position of stage 114 with respect to objective 102.

The means of adjusting focus are provided as an illustrative example. A person of ordinary skill in the art will note that other means may be used in conjunction with the systems and methods described herein.

An epi-illumination module 705 may be configured to illuminate a sample positioned on stage 114. In some embodiments, the epi-illumination module 705 may be further configured to provide a pattern in an image, collected by the imaging device 116, which may be utilized to automatically focus the microscopy system 700. In some embodiments, the epi-illumination module 705 is a removable module from the microscopy system 700. In further embodiments, the epi-illumination module 705 may include multiple components, each of which are independently removable.

In some embodiments, the epi-illumination module 705 may be interfaced to a first illumination source 701 and a second illumination source 702. In some embodiments, the epi-illumination module 705 may include a focusing mechanism 704. The first 701 and second 702 illumination sources may be configured to illuminate the stage 114. For example, the first illumination source 701 may be configured to illuminate the stage 114 for determining when the microscopy system 100 is in focus. In some embodiments, the epi-illumination module 705 includes one or more optical elements 108, 708 configured to produce homogeneous illumination of the sample plane 101. In some embodiments, the optical elements 108, 708 may include at least one or more collimating and/or focusing lenses. In further embodiments, the optical elements 108, 708 may form an aperture stop conjugated to the objective back focal plane 105.

In some embodiments, the epi-illumination module 705 may include a beam splitter 703 configured to merge the optical path from a second illumination source 702. In some embodiments, the beam splitter may be inserted after a collimating lens in optical paths of the first 701 and second 702 illumination source optical paths. In some embodiments, the two illumination sources 701, 702 may be of two different frequencies. In some embodiments, the optical path of a second illumination source 702 may be unimpeded by the focusing mechanism 704. In some embodiments, the second illumination source 702 may produce white light. In some embodiments, a light of any wavelength range may be used for a second illumination source 702. It should be noted that the introduction of the beam splitter 703 may rotate the pattern produced by the focusing mechanism 704, and therefore, the axis of the sharpest regions in captured images.

In some embodiments, the epi-illumination module 705 includes a dichroic mirror 111 configured to reflect the light from the first and second illumination sources 701, 702 through the objective 102 onto the sample positioned on stage 114. In some embodiments, the epi-illumination module 705 includes one or more filters (e.g., an excitation filter 112 and/or an emission filter 113). In some embodiments, a portion of the one or more filters may be polarizing.

In some embodiments, the focusing mechanism 704 may be positioned in the optical path of the first illumination source 701 within the epi-illumination module 705. In some embodiments, the focusing mechanism 704 may be positioned after a collimating lens such that the light passing through the focusing mechanism is aligned in a primarily parallel fashion. In some embodiments, the focusing mechanism 704 may be configured to provide a pattern in an image, collected by the imaging device 116, which may be utilized to automatically focus the microscopy system 700.

In some embodiments, the focusing mechanism 704 may be representative of a mesh. In some embodiments, the focusing mechanism 704 may be representative of a piece of glass that includes a Ronchi ruling pattern. A person of ordinary skill in the art will recognize that any finely patterned element configured to allow at least partial transmission of light from the first illumination source 701 may operate as a focusing mechanism 704. In operation, for example, the light generated from the first illumination source 701 may pass through the focusing mechanism 704 on a path to illuminate the stage 114. In some embodiments, the focusing mechanism 704 may be tilted with respect to a plane perpendicular to the primary path of the light generated from the first illumination source 701. In other words, the focusing mechanism 704 may be tilted such that the focusing mechanism 704 is not parallel to the optical elements 108 in the epi-illumination module 705. In some embodiments, the focusing mechanism 704 is configured to intersect a field stop conjugated to the sample plane 101 and a field stop conjugated to the image plane 104. In some embodiments, the focusing mechanism 704 intersects multiple field stops not conjugated to the sample plane 101.

A person of ordinary skill in the art will note that some epi-illumination modules may include a diffuser configured to prevent objects upstream from being imaged. In some embodiments, the systems and methods described herein may require the removal of said diffuser.

Figure 8A:
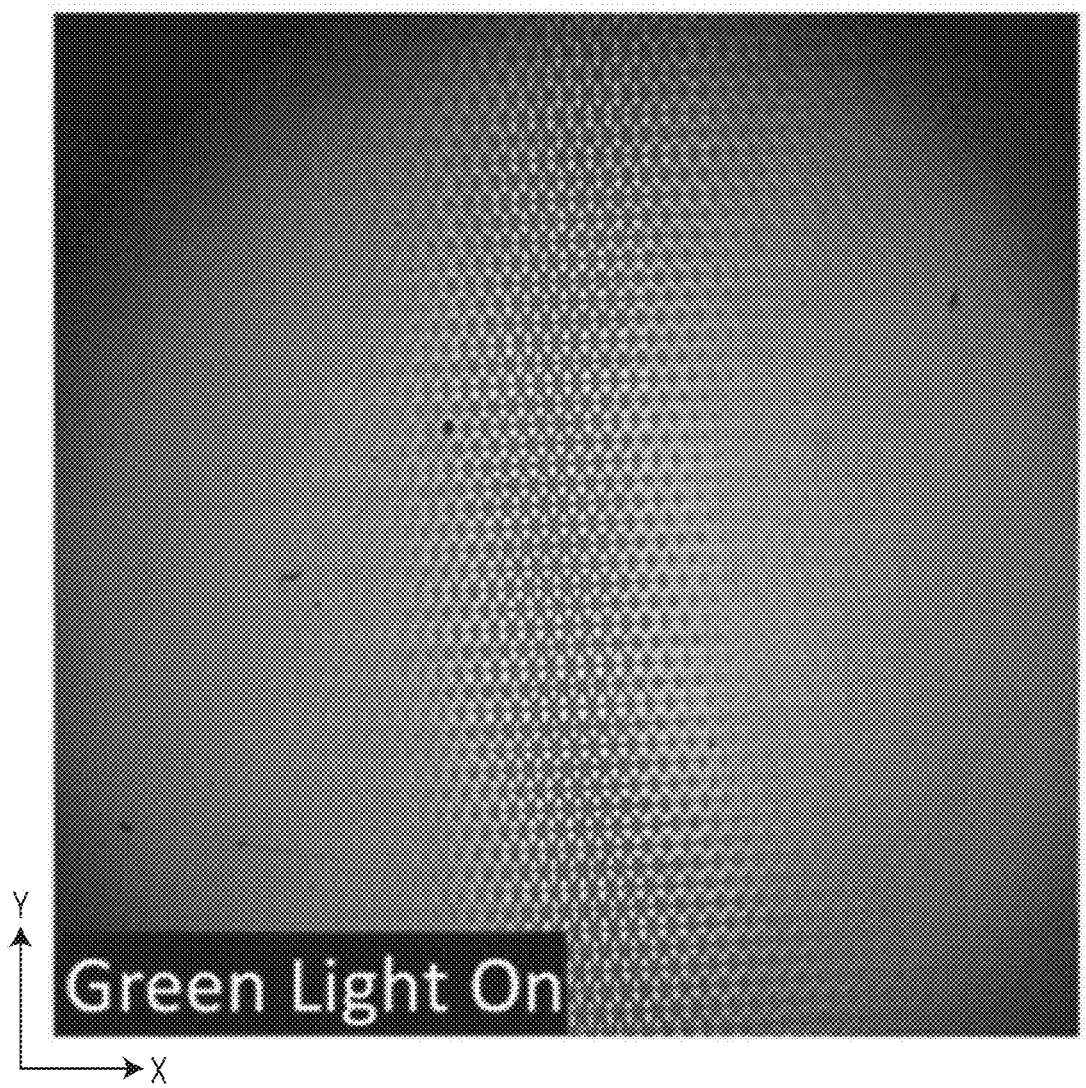
FIGS. 8A-8B depict example captured images from the system of FIG. 7, according to example embodiments.
Figure 8B:
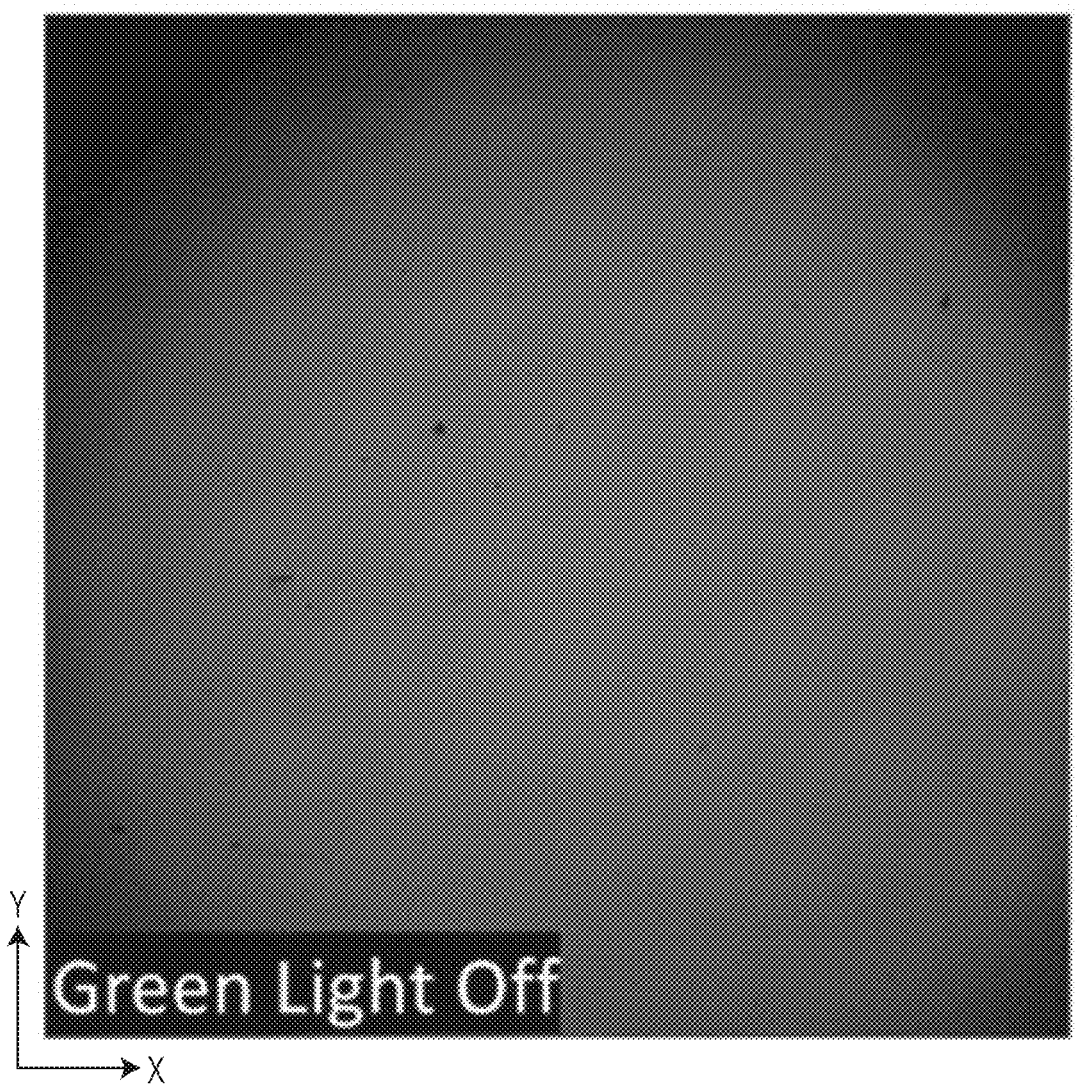

Referring to FIG. 8A, an example image, with the illumination source associated with the focusing mechanism enabled, is depicted in accordance with an embodiment. By turning off the illumination source associated with the focusing mechanism, the sample may be imaged without the focusing pattern, as depicted in FIG. 8B.

In some embodiments, the focusing mechanism may be automatically removed, either physically or optically, after determining a focus direction and distance. In some embodiments, the system may automatically capture an image of the sample following removal of the focusing mechanism. In further embodiments, the system may reinsert the focusing mechanism, either physically or optically, after imaging the sample.

In some embodiments, the system may analyze an image of the sample without the focusing mechanism for quality assurance. In some embodiments, the quality assurance may include quantitatively assessing the focus of an image. In some embodiments, the assessment may feedback (e.g., validation) into the machine learning algorithm.

In some embodiments, controller may control any settings of the components of automatic focus system (actuators for focus, actuators which move the focusing mechanism, illumination sources) as well as communications, operations (e.g., taking images, turning on and off an illumination source, moving the stage and objective, storing different values associated with a sample) and calculations performed by, and between, components of the automatic focus system. In some embodiments, the controller may include any suitable hardware (which can execute software in some embodiments), such as, for example, computers, microprocessors, microcontrollers, application specific integrated circuits (ASICs), and digital signal processors (any of which can be referred to as a hardware processor), encoders, circuitry to read encoders, memory devices (including one or more EPROMS, one or more EEPROMs, dynamic random access memory ("DRAM"), static random access memory ("SRAM"), and/or flash memory), and/or any other suitable hardware elements. In some embodiments, individual components within automatic focus system may include their own software, firmware, and/or hardware to control the individual components and communicate with other components in automatic focus system.

In some embodiments, communication between the control system (e.g., controller and controller interface) and the components of automatic focus system may use analog technologies (e.g., relay logic), digital technologies (e.g., using RS232, ethernet, or wireless) and/or any other suitable communication technologies.

In some embodiments, operator inputs can be communicated to the control system using any suitable input device (e.g., a keyboard, mouse, or joystick).

Figure 9A:
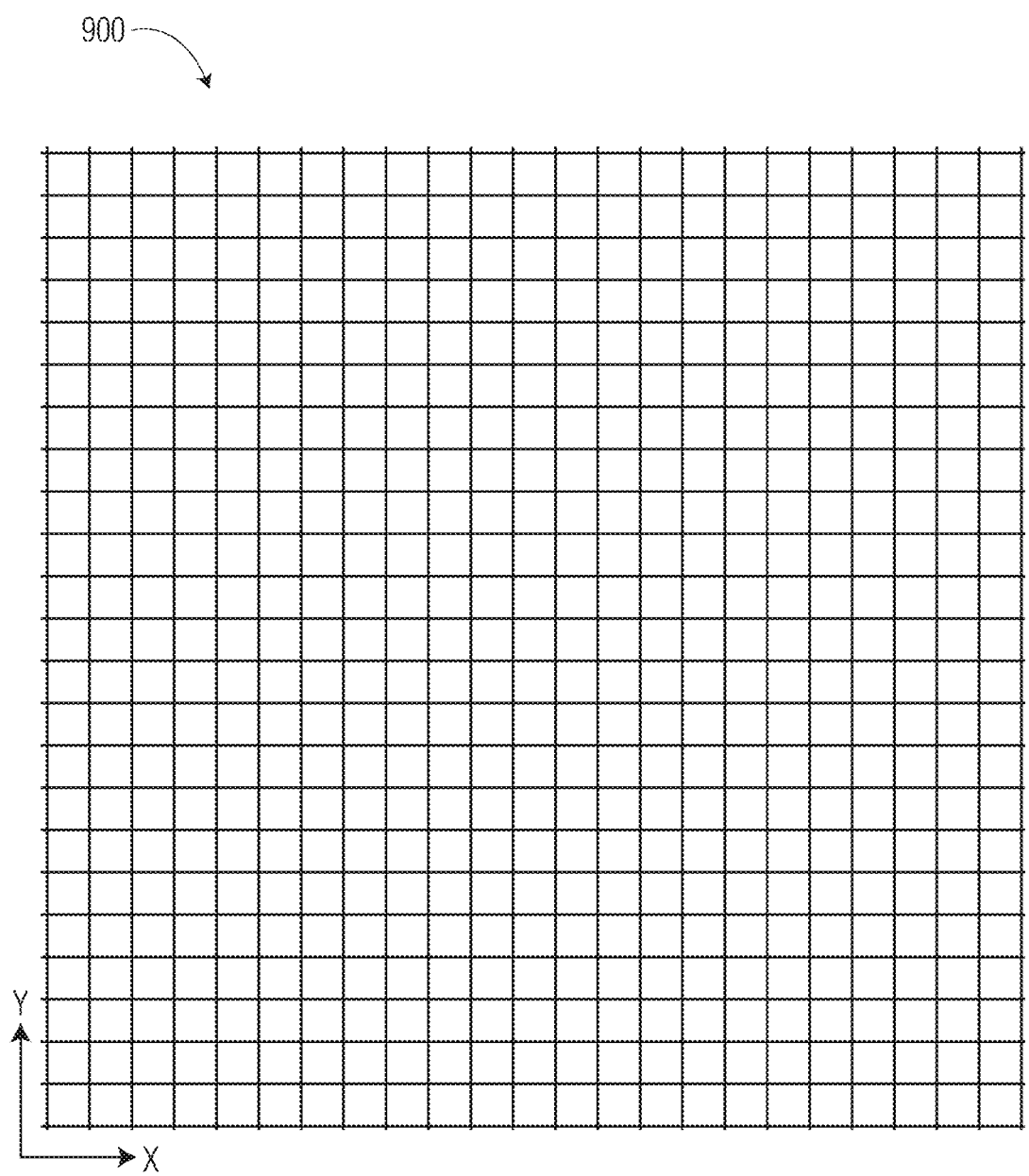
FIG. 9A depicts a focusing mechanism for use in a microscopy system, according to example embodiments.

FIG. 9A illustrates a focusing mechanism 900, according to example embodiments. The focusing mechanism 900 may be used in place of focusing mechanism 110 or focusing mechanism 704. As shown, focusing mechanism 900 may take the form of a mesh. A mesh as described herein may refer to any material with multiple rulings that is, at least partially, permeable to light. In some embodiments, the mesh may be a wire mesh. One of ordinary skill in the art will recognize that alternative optical masks may provide similar or additional benefits. In some embodiments, the mesh may be configured such that the pattern, generated by the mesh, is applied to an entire image captured by the system. In other embodiments, the mesh may be configured such that the pattern, generated by the mesh, is applied to a portion of the image. For example, a system requiring greater precision may include a mesh that applies the pattern to the entire image. In another example, an alternative system may feature samples with limited variance in depth and capture viable images with mesh pattern visible along one or more edges of the image. Quality assurance may reimage one or more images, using the autofocus methods disclosed herein, if the image is determined to be out of focus.

Figure 9B:
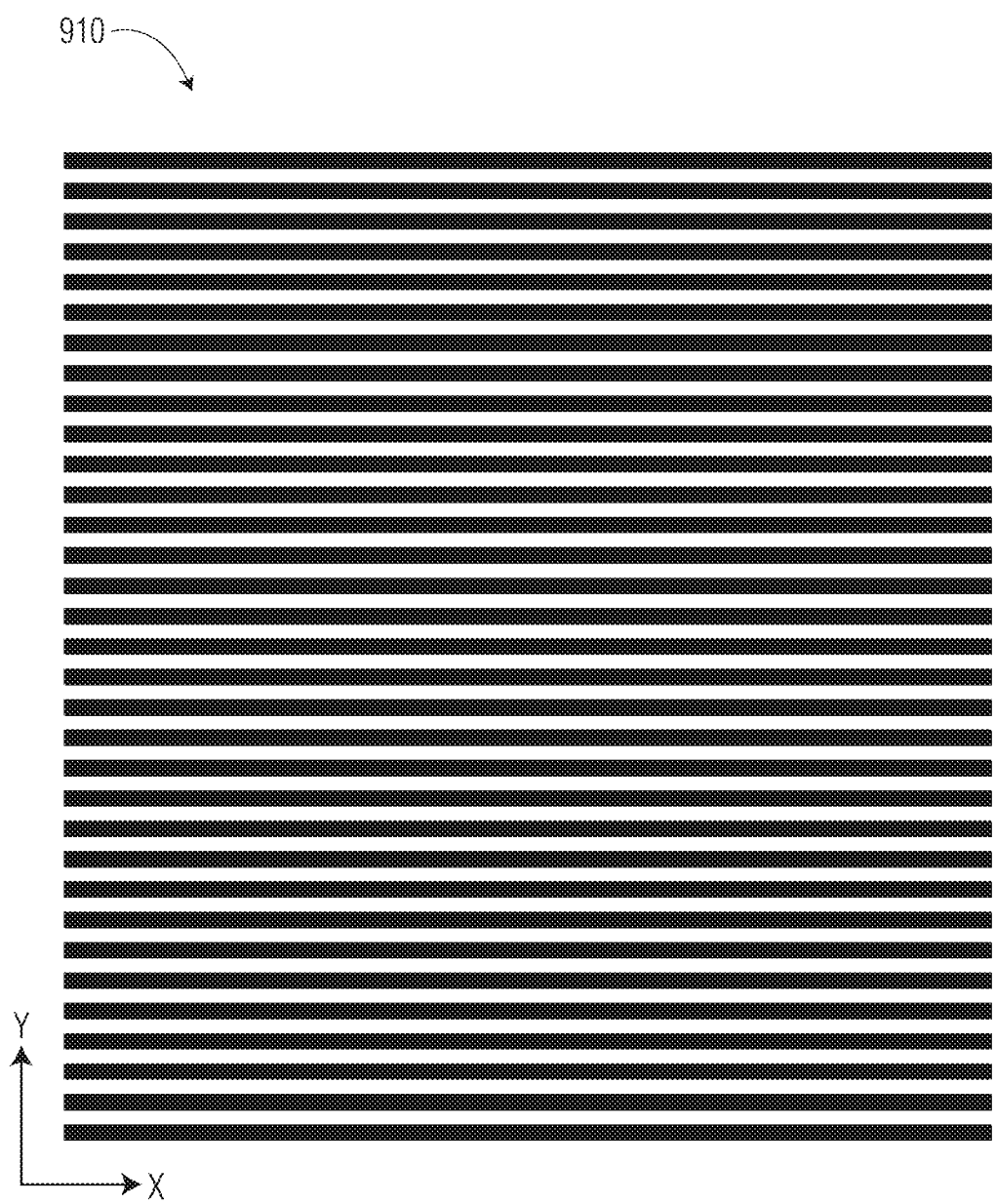
FIG. 9B depicts a focusing mechanism for use in a microscopy system, according to example embodiments.

FIG. 9B illustrates a focusing mechanism 910, according to example embodiments. The focusing mechanism 910 may be used in place of the focusing mechanism 110 or the focusing mechanism 704. As shown, the focusing mechanism 910 may take the form of a transparent slide (e.g., glass or plastic) that includes a Ronchi ruling pattern. A Ronchi ruling is a constant-interval bar and space square wave optical mask that has a high edge definition and contrast ratio. In some embodiments, a Ronchi ruling may act as a mesh. In some embodiments, a Ronchi ruling is manufactured through photolithographic deposition of chrome on glass. In some embodiments, a Ronchi ruling may allow for more tilt in the focusing mechanism 910, due to the negligible thickness of the deposition. In some embodiments, a Ronchi ruling may have a finer pattern. As an example, a Ronchi ruling may have approximately 10 line pairs per millimeter and a 50 micrometer width. In some embodiments, a Ronchi ruling may be slightly transparent.

Figure 10:
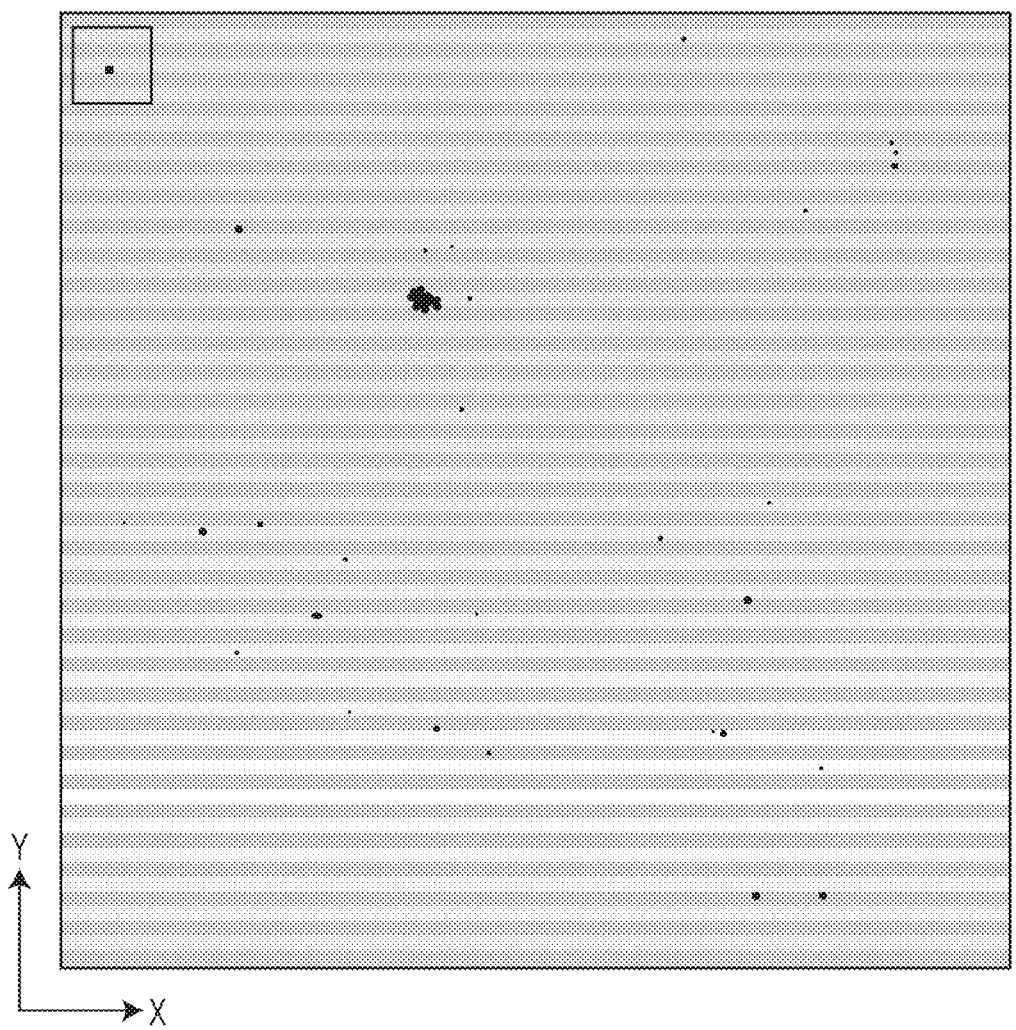
FIG. 10 depicts an example captured image using the focusing mechanism of FIG. 9B, depicts a focusing mechanism for use in a microscopy system, according to example embodiments.

Referring to FIG. 10, an image produced with an epi-illumination system including a Ronchi ruling is depicted. In some embodiments, the uniform, well-spaced pattern allows for improved performance of the machine learning algorithm.

Figure 11:
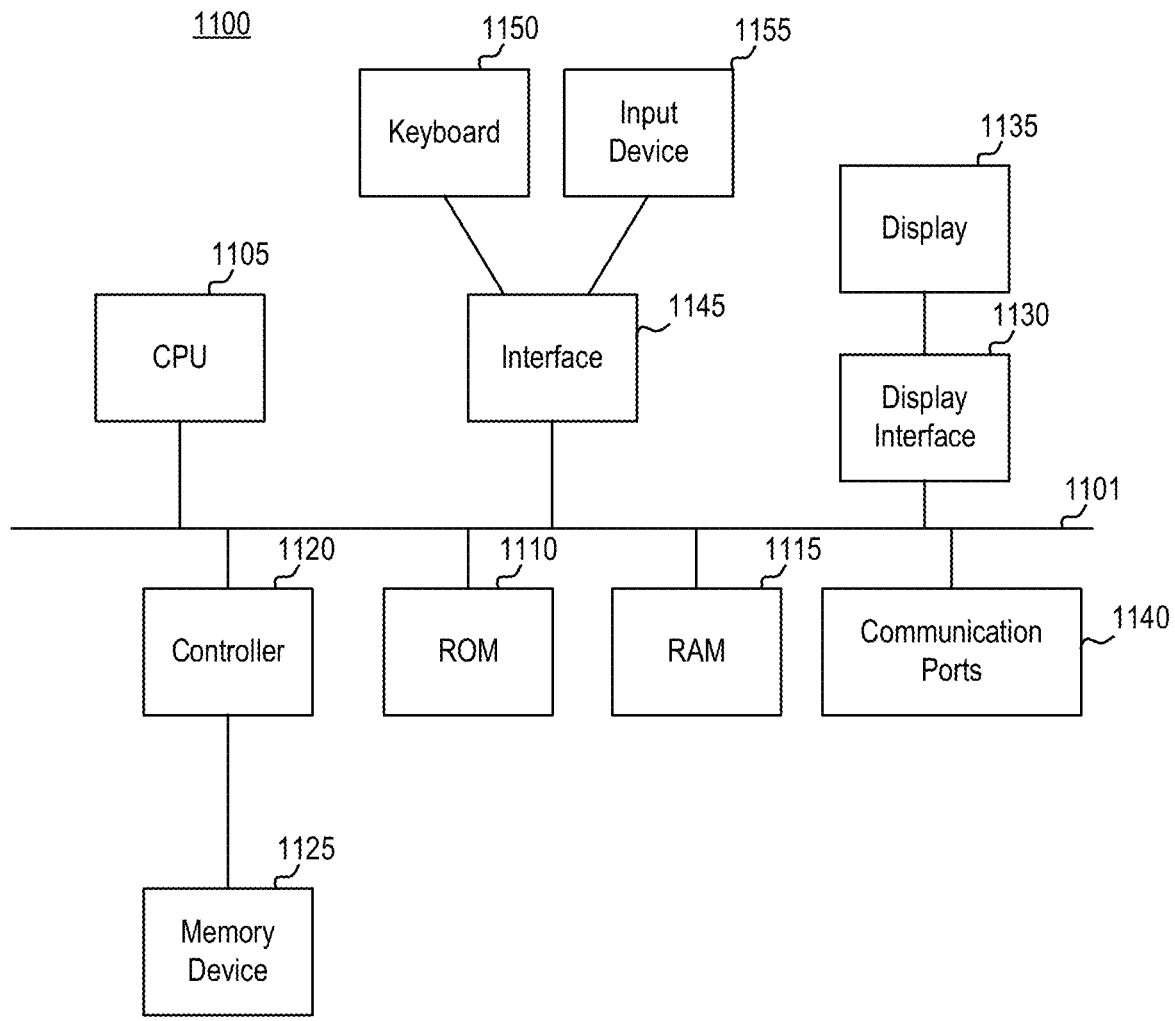
FIG. 11 depicts an illustrative block diagram of an exemplary data processing system, depicts a focusing mechanism for use in a microscopy system, according to example embodiments.

FIG. 11 depicts a block diagram of exemplary data processing system 1100 comprising internal hardware that may be used to contain or implement the various computer processes and systems as discussed above. In some embodiments, data processing system 1100 may be representative of the controller associated with FIG. 1 and/or FIG. 7. In some embodiments, the exemplary internal hardware may include or may be formed as part of a programmable logic controller (PLC) system. In some embodiments, the exemplary internal hardware may include or may be formed as part of an additive manufacturing control system, such as a three-dimensional printing system. A bus 1101 serves as the main information highway interconnecting the other illustrated components of the hardware. CPU 1105 is the central processing unit of the system, performing calculations and logic operations required to execute a program. CPU 1105 is an exemplary processing device, computing device or processor as such terms are used within this disclosure. Read only memory (ROM) 1110 and random access memory (RAM) 1115 constitute exemplary memory devices.

A controller 1120 interfaces with one or more optional memory devices 1125 via the system bus 1101. These memory devices 1125 may include, for example, an external or internal DVD drive, a CD ROM drive, a hard drive, flash memory, a USB drive or the like. As indicated previously, these various drives and controllers are optional devices. Additionally, the memory devices 1125 may be configured to include individual files for storing any software modules or instructions, data, common files, or one or more databases for storing data.

Program instructions, software or interactive modules for performing any of the functional steps described above may be stored in the ROM 1110 and/or the RAM 1115. Optionally, the program instructions may be stored on a tangible computer-readable medium such as a compact disk, a digital disk, flash memory, a memory card, a USB drive, an optical disc storage medium, such as a Blu-Ray™ disc, and/or other recording medium.

An optional display interface 1130 can permit information from the bus 1101 to be displayed on the display 1135 in audio, visual, graphic or alphanumeric format. Communication with external devices can occur using various communication ports 1140. An exemplary communication port 1140 can be attached to a communications network, such as the Internet or a local area network.

The hardware can also include an interface 1145 which allows for receipt of data from input devices such as a keyboard 1150 or other input device 1155 such as a mouse, a joystick, a touch screen, a remote control, a pointing device, a video input device and/or an audio input device.

This disclosure is not limited to the particular systems, devices and methods described, as these may vary. The terminology used in the description is for the purpose of describing the particular versions or embodiments only and is not intended to limit the scope of the disclosure.

The following terms shall have, for the purposes of this application, the respective meanings set forth below. Unless otherwise defined, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention.

As used herein, the singular forms "a," "an," and "the" include plural references, unless the context clearly dictates otherwise. Thus, for example, reference to a "cell" is a reference to one or more cells and equivalents thereof known to those skilled in the art, and so forth.

As used herein, the term "about" means plus or minus 10% of the numerical value of the number with which it is being used. Therefore, about 50 mm means in the range of 45 mm to 55 mm.

As used herein, the term "consists of" or "consisting of" means that the device or method includes only the elements, steps, or ingredients specifically recited in the particular claimed embodiment or claim.

In embodiments or claims where the term "comprising" is used as the transition phrase, such embodiments can also be envisioned with replacement of the term "comprising" with the terms "consisting of" or "consisting essentially of."

As will be understood by one skilled in the art, for any and all purposes, such as in terms of providing a written description, all ranges disclosed herein are intended as encompassing each intervening value between the upper and lower limit of that range and any other stated or intervening value in that stated range. All ranges disclosed herein also encompass any and all possible subranges and combinations of subranges thereof. Any listed range can be easily recognized as sufficiently describing and enabling the same range being broken down into at least equal halves, thirds, quarters, fifths, tenths, et cetera. As a non-limiting example, each range discussed herein can be readily broken down into a lower third, middle third and upper third, et cetera. As will also be understood by one skilled in the art, all language such as "up to," "at least," and the like include the number recited and refer to ranges that can be subsequently broken down into subranges as discussed above. Finally, as will be understood by one skilled in the art, a range includes each individual member. Thus, for example, a group having 1-3 components refers to groups having 1, 2, or 3 components as well as the range of values greater than or equal to 1 component and less than or equal to 3 components. Similarly, a group having 1-5 components refers to groups having 1, 2, 3, 4, or 5 components, as well as the range of values greater than or equal to 1 component and less than or equal to 5 components, and so forth.

In addition, even if a specific number is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, et cetera" is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, et cetera). In those instances where a convention analogous to "at least one of A, B, or C, et cetera" is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, et cetera). It will be further understood by those within the art that virtually any disjunctive word and/or phrase presenting two or more alternative terms, whether in the description, sample embodiments, or drawings, should be understood to contemplate the possibilities of including one of the terms, either of the terms, or both terms. For example, the phrase "A or B" will be understood to include the possibilities of "A" or "B" or "A and B."

In addition, where features of the disclosure are described in terms of Markush groups, those skilled in the art will recognize that the disclosure is also thereby described in terms of any individual member or subgroup of members of the Markush group.

While the present disclosure has been illustrated by the description of exemplary embodiments thereof, and while the embodiments have been described in certain detail, the Applicant does not intend to restrict or in any way limit the scope of the appended claims to such detail. Additional advantages and modifications will readily appear to those skilled in the art. Therefore, the disclosure in its broader aspects is not limited to any of the specific details, representative devices and methods, and/or illustrative examples shown and described. Accordingly, departures may be made from such details without departing from the spirit or scope of the Applicant's general inventive concept.

In the above detailed description, reference is made to the accompanying drawings, which form a part hereof. In the drawings, similar symbols typically identify similar components, unless context dictates otherwise. The illustrative embodiments described in the present disclosure are not meant to be limiting. Other embodiments may be used, and other changes may be made, without departing from the spirit or scope of the subject matter presented herein. It will be readily understood that various features of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various features. Instead, this application is intended to cover any variations, uses, or adaptations of the present teachings and use its general principles. Further, this application is intended to cover such departures from the present disclosure as come within known or customary practice in the art to which these teachings pertain. Many modifications and variations can be made to the particular embodiments described without departing from the spirit and scope of the present disclosure as will be apparent to those skilled in the art. Functionally equivalent methods and apparatuses within the scope of the disclosure, in addition to those enumerated herein, will be apparent to those skilled in the art from the foregoing descriptions. It is to be understood that this disclosure is not limited to particular methods, reagents, compounds, compositions or biological systems, which can, of course, vary. It is also to be understood that the terminology used herein is for the purpose of describing particular embodiments only and is not intended to be limiting.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A microscopy system comprising:
   an objective;
   an imaging device configured to capture images of a specimen positioned on a stage of the microscopy system;
   an illumination source configured to illuminate the specimen positioned on the stage;
   an epi-illumination module comprising a focusing mechanism in a first primary optical path of a light generated by the illumination source, wherein the focusing mechanism is tilted in relation to a plane perpendicular to the first primary optical path, the focusing mechanism configured to produce a pattern on the specimen; and
   a controller in communication with the imaging device, wherein the controller comprises one or more programming instructions that, when executed, cause the controller to receive a single image of the specimen from the imaging device, the single image comprising the pattern produced by the focusing mechanism and focus the microscopy system based on only the single image captured by the imaging device, the single image comprising the pattern produced by the focusing mechanism.

2. The microscopy system of claim 1, wherein the one or more programming instructions that, when executed, cause the controller to focus the microscopy system further comprises one or more programming instructions that, when executed, cause the controller to determine an optimal distance of the objective to the specimen based on the pattern produced by the focusing mechanism.

3. The microscopy system of claim 2, wherein the one or more programming instructions that, when executed, cause the controller to determine an optimal distance of the objective to the specimen further comprises one or more programming instructions that, when executed, cause the controller to determine a pixel position of a sharpest region in the single image.

4. The microscopy system of claim 3, wherein the one or more programming instructions that, when executed, cause the controller to determine a pixel position of a sharpest region in the single image further comprises one or more programming instructions that, when executed, cause the controller to:
   perform feature enhancement on the single image;
   determine a sharp region of the single image based on the feature enhancement;
   determine an average projection along an axis for the sharp region; and
   determine a peak value of the average projection.

5. The microscopy system of claim 4, wherein the one or more programming instructions that, when executed, cause the controller to perform feature enhancement on the single image further comprises one or more programming instructions that, when executed, cause the controller to apply an edge detection algorithm to the single image.

6. The microscopy system of claim 5, wherein the one or more programming instructions that, when executed, cause the controller to apply the edge detection algorithm to the single image further comprises one or more programming instructions that, when executed, cause the controller to calculate a difference of Gaussians.

7. The microscopy system of claim 4, wherein the one or more programming instructions that, when executed, cause the controller to determine the peak value of the average projection further comprises one or more programming instructions that, when executed, cause the controller to:
   determine a best fit Gaussian to the average projection; and
   determine a peak value for the best fit Gaussian.

8. The microscopy system of claim 1, wherein the focusing mechanism is configured to be moved in and out of the first primary optical path.

9. The microscopy system of claim 5, wherein the epi-illumination module further comprises a motor to move the focusing mechanism in and out of the first primary optical path.

10. The microscopy system of claim 1, further comprising:
    a second illumination source with a second primary optical path; and
    a beam splitter configured to merge the first primary optical path and the second primary optical path.

11. The microscopy system of claim 10, wherein the second illumination source generates white light.

12. The microscopy system of claim 10, wherein the illumination source generates a unique light wavelength.

13. The microscopy system of claim 1, wherein the focusing mechanism is a mesh screen.

14. The microscopy system of claim 1, wherein the focusing mechanism is a glass slide comprising the pattern etched therein.

15. A method for focusing a microscopy system, comprising:
    causing, by a controller, an illumination source of the microscopy system to illuminate a specimen positioned on a stage of the microscopy system, wherein a focusing mechanism positioned in a light path between the illumination source and the stage forms a pattern on the specimen;
    receiving, by the controller, only a single image of the specimen, wherein the single image comprises the pattern produced by the focusing mechanism; and
    focusing, by the controller, the microscopy system based on only the single image by:
       determining that the single image is not in focus by analyzing the pattern produced by the focusing mechanism, and
       determining adjustments to the microscopy system based on the analyzed pattern produced by the focusing mechanism in the single image the determining, focusing, by the controller, the microscopy system.

16. The method of claim 15, wherein analyzing the pattern produced by the focusing mechanism comprises:

analyzing, by the controller, the pattern produced by the focusing mechanism to determine an optimal distance of an objective of the microscopy system to the specimen; and focusing, by the controller, the microscopy system based on the optimal distance.

17. The method of claim 16, wherein determining, by the controller, the optimal distance of the objective to the specimen comprises:

determining a pixel position of a sharpest region in the single image by:

performing feature enhancement on the single image;

determining a sharp region of the single image based on the feature enhancement;

determining an average projection along an axis for the sharp region; and determining a peak value of the average projection.

18. A focusing system for automatically focusing a microscopy system, comprising:

an illumination source; and a focusing mechanism configured to be positioned within a light path produced by the illumination source, the focusing mechanism configured to project a pattern on a specimen to be imaged by the microscopy system, wherein the focusing mechanism allows for focusing of the microscopy system using only a single image, wherein the single image comprises the pattern on the specimen.

19. The focusing system of claim 18, wherein the focusing mechanism is a mesh screen or a glass slide comprising the pattern etched therein.

* * * * *